United States Patent
Hatier et al.

(10) Patent No.: US 8,981,601 B2
(45) Date of Patent: Mar. 17, 2015

(54) METHOD OF OPERATING A REMOTELY-CONTROLLED SWITCHING DEVICE OF AN ENERGY MANAGEMENT SYSTEM

(75) Inventors: Jean-Denis Hatier, Sherbrooke (CA); Reginald Paquin, Sherbrooke (CA)

(73) Assignee: Technologie Demtroys Inc., Sherbrooke, Quebec (CA)

( * ) Notice: Subject to any disclaimer, the term of this patent is extended or adjusted under 35 U.S.C. 154(b) by 534 days.

(21) Appl. No.: 13/478,963

(22) Filed: May 23, 2012

(65) Prior Publication Data

US 2013/0009471 A1 Jan. 10, 2013

Related U.S. Application Data

(60) Provisional application No. 61/504,931, filed on Jul. 6, 2011.

(51) Int. Cl.
*H01H 9/54* (2006.01)

(52) U.S. Cl.
USPC .......................................................... 307/140

(58) Field of Classification Search
USPC .......................................................... 307/140
See application file for complete search history.

(56) References Cited

U.S. PATENT DOCUMENTS

| | | | |
|---|---|---|---|
| 4,132,355 A | 1/1979 | Cleary et al. | |
| 4,799,176 A | 1/1989 | Cacciatore | |
| 5,625,236 A | 4/1997 | Lefebvre et al. | |
| 5,640,316 A | 6/1997 | Moriya | |
| 5,682,949 A | 11/1997 | Ratcliffe et al. | |
| 5,764,024 A | 6/1998 | Wilson | |
| 5,892,665 A | 4/1999 | Matsumoto et al. | |
| 6,252,209 B1 | 6/2001 | Liepold | |
| 6,647,318 B2 | 11/2003 | Salsbury | |
| 6,681,848 B2 | 1/2004 | Breeden | |
| 7,161,819 B2 | 1/2007 | Kolomeitsev et al. | |
| 7,379,685 B2 | 5/2008 | Tatematsu et al. | |
| 7,456,522 B2 | 11/2008 | Priest | |
| 7,471,525 B2 | 12/2008 | Suzuki et al. | |
| 7,796,867 B2 | 9/2010 | Miyajima et al. | |
| 7,990,200 B2 | 8/2011 | Chen et al. | |
| 8,143,748 B2 | 3/2012 | Ochi | |
| 2009/0099697 A1 | 4/2009 | Li et al. | |

(Continued)

FOREIGN PATENT DOCUMENTS

| | | |
|---|---|---|
| CA | 2549368 | 12/2007 |
| GB | 2359150 | 8/2001 |
| JP | 4210776 A | 7/1992 |
| JP | 4304169 | 10/1992 |

(Continued)

*Primary Examiner* — Robert L. Deberadinis
(74) *Attorney, Agent, or Firm* — IPAXIO S.E.N.C.

(57) ABSTRACT

The method is for operating a remotely-controlled switching device of an energy management system. The switching device is mounted in series on a local electrically powered circuit on which are also mounted in series a load and an electronic thermostat. The method includes generating a first pulsed signal for controlling the switching device, the switching device opening and closing the circuit in response to the first signal. The circuit is opened to prevent the load from operating and is closed when operation of the load is allowed. The method includes generating a second pulsed signal for controlling the switching device at least when the circuit is opened by the switching device in response to the first signal. The second signal causes the switching device to temporarily close the opened circuit at given intervals for keeping an internal circuitry of the thermostat energized while still substantially preventing the load from operating.

20 Claims, 3 Drawing Sheets

(56) References Cited

U.S. PATENT DOCUMENTS

| | | |
|---|---|---|
| 2010/0006554 A1 | 1/2010 | Inoue et al. |
| 2010/0085676 A1 | 4/2010 | Wilfert |
| 2010/0141032 A1 | 6/2010 | Joos et al. |
| 2010/0213865 A1 | 8/2010 | Gray et al. |

FOREIGN PATENT DOCUMENTS

| | | |
|---|---|---|
| JP | 8251931 | 9/1996 |
| JP | 2010081686 | 4/2010 |
| JP | 2010206896 | 9/2010 |
| KR | 20020008596 | 1/2002 |
| WO | 9749957 A1 | 12/1997 |
| WO | 2009112484 | 9/2009 |

METHOD OF OPERATING A REMOTELY-CONTROLLED SWITCHING DEVICE OF AN ENERGY MANAGEMENT SYSTEM

CROSS-REFERENCE

The present application claims the benefits of U.S. provisional patent application No. 61/504,931 filed 6 Jul. 2011, the content of which is hereby incorporated by reference.

TECHNICAL FIELD

The technical field relates generally to methods of operating remotely-controlled switching devices of energy management systems.

BACKGROUND

Various arrangements have been suggested over the years to manage the energy consumption in buildings having a plurality of zones. These energy management systems can be very useful in many situations, for instance for peak load management and/or for energy conservation purposes. Examples of these arrangements are presented in U.S. Pat. No. 4,132,355 of 2 Jan. 1979 (Clear et al.) and in U.S. Pat. No. 5,625,236 of 29 Apr. 1997 (Lefebvre et al.), to name just a few.

An energy management system generally includes a remote console that can control a plurality of power-consuming apparatuses located in the various zones. An example of such apparatuses is a heating unit. Different approaches exist for controlling them. One of these approaches involves the use of switching devices, such as relays, that are each mounted in series on the local electric circuit feeding power to the apparatus. Each switching device is actuated from the remote console. The operation of the apparatus can be prevented or authorized by selectively opening and closing the electric circuit using the switching device.

In some implementations in which the apparatuses are heating units, an electronic thermostat is located in each zone to control the temperature. It includes an internal electronic circuitry providing functions that are not available with a bimetallic thermostat or a thermostat with a mercury switch. For instance, an electronic thermostat can be designed to automatically change the temperature set point at specific times of the day. It can also be designed to generate a "pulsed" heating so as to lower the energy output of the heating unit and thereby minimizing the temperature fluctuations in the zone. Pulsed heating can be achieved by switching the voltage on and off over a given period of time. This period of time is generally a few seconds, for instance 15 seconds. Nevertheless, using other time lengths is also possible. The proportion of "on" time over the given time period is called the duty cycle. A duty cycle of 100% means that the heating unit receives the full electrical power. However, a duty cycle of 25% corresponds to a situation where the power is "on" only 25% of the time, thus to a situation where the heating unit receives only 25% of the normal electric power during the given time period and generates only about 25% of the normal heat.

Various models of electronic thermostats exist for achieving pulsed heating. Some of them are designed to be mounted in series on one of the wires of an electrically powered circuit without the need for a neutral or ground wire. These electronic thermostats are able to draw the power needed to energize their internal circuitry directly from the single wire. However, this works as long as the electric circuit is closed, namely when the electronic thermostat is the only device controlling the electrical power fed to the heating unit.

When using a switching device mounted in series on a circuit as part of an energy management system, the circuit will be "opened" when the switching device is in its "open" position. This opened position will prevent the corresponding heating unit from operating, thereby completely overriding the normal control provided by the local electronic thermostat. However, sometimes even after only a few seconds, the internal circuitry of the corresponding electronic thermostats will run out of power since it needs the circuit to be closed to get its own power. When this happens, the electronic thermostat may no longer function as usual. The display of the electronic thermostat will disappear and, depending on the models, the user's settings of the thermostat can even be lost.

Switching devices can be used to open the circuits for long periods of time, even sometimes days or weeks, but some energy management systems can also use the switching devices to create a "pulsed" heating, even if the local electronic thermostats may also be designed to create a pulsed heating. This, however, may sometimes prevent the electronic thermostats from receiving the minimal power they need for energizing their internal circuitry, especially if each cycle of the pulsed heating controlled through the switching device is relatively long. For instance, in a case where the period is 10 seconds and the duty cycle is 50%, the circuit will be opened for 5 seconds during each period of 10 seconds. The internal circuitry of an electronic thermostat will run out of power during these 5 seconds unless it includes a capacitor or the like that is capable of keeping the internal circuitry energized for at least the 5 seconds the circuit is open. If not, it will run out of power once during every cycle, thereby causing its display screen to fade, blink or disappear at each cycle. Other problems may also be experienced with the electronic thermostats in this case.

Some electronic thermostats are provided with a backup battery or even with other auxiliary backup power arrangements, for instance a dedicated power line. However, many models are not and this can become a challenge during the installation of an energy management system in an existing building. In fact, changing existing electronic thermostats that are otherwise working perfectly well is not necessarily desirable for many reasons, costs being one of them. Still, using a backup battery may not solve the problem, especially when a switching device opens the circuit for a long time or when battery power would be needed at frequent time intervals since the battery will eventually run out of power as well.

Clearly, room for improvements still exists in this area.

SUMMARY

In one aspect, there is provided a method of operating a remotely-controlled switching device of an energy management system, the switching device being mounted in series on a local electrically powered circuit on which are also mounted in series a load and an electronic thermostat, the method including: generating a first pulsed signal for controlling the switching device, the switching device opening and closing the circuit in response to the first signal, the circuit being opened to prevent the load from operating and being closed when operation of the load is allowed; and generating a second pulsed signal for controlling the switching device at least when the circuit is opened by the switching device in response to the first signal, the second signal causing the switching device to temporarily close the opened circuit at given intervals for keeping an internal circuitry of the electronic thermostat energized while still substantially preventing the load from operating.

Further details on this aspect as well as other aspects of the proposed concept will be apparent from the following detailed description and the appended figures.

DETAILED DESCRIPTION

Figure 1:
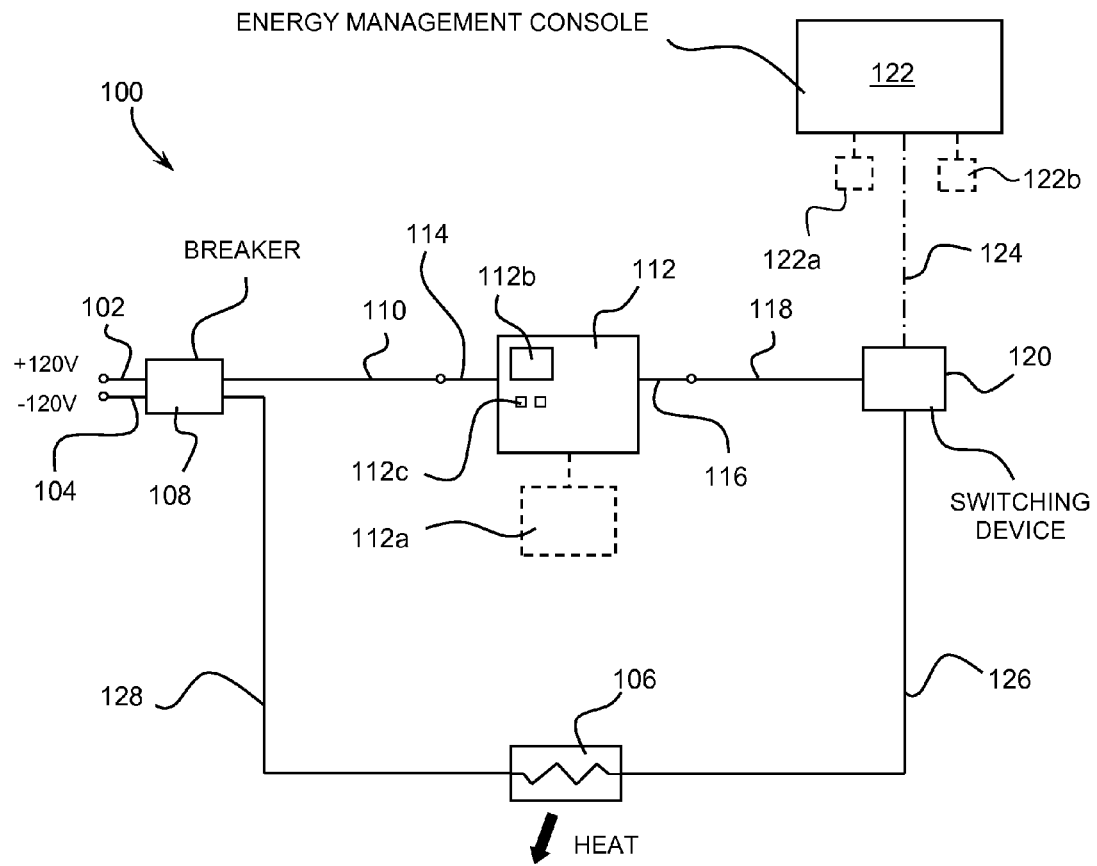
FIG. 1 is a schematic view illustrating an example of a simplified local electric circuit for implementing the concept as suggested herein.

FIG. 1 is a schematic view illustrating an example of simplified local electric circuit 100 for implementing the concept as suggested herein. The illustrated circuit 100 is generic in nature and accordingly, additional components and/or variants are possible. The circuit 100 receives electric power from a 240-volt, 60-hertz AC main supply line. The supply line includes a first wire 102 with a first phase at +120 Volts and a second wire 104 with a phase at −120 Volts. The first and second phases are 180° apart. Nevertheless, other voltages, frequencies and configurations are also possible. For instance, the phases in some buildings can be 120° apart with +120 Volts and −120 Volts between them. Other examples are possible as well.

FIG. 1 illustrates only one of the circuits of a building that can be managed using an energy management system. Examples of buildings in which such system can be useful include retirement homes, multi-unit buildings and commercial/institutional constructions, to name just a few. Generally, the building is divided in a plurality of zones. A zone can be a single room or a plurality of rooms, such as a single condo unit. Variants are also possible as well.

For the sake of simplicity, the example illustrated in FIG. 1 shows a configuration where the zone corresponds to a single room that has its own electric circuit 100 for supplying power to a single heating unit 106, in particular a resistive heater located in the room. Variants are possible as well. For instance, the circuit 100 can supply power to more than one heating unit in the room and/or the heating units can be located in more than one room. The heating unit(s) can also be or include a hot water heater that is not necessarily itself in the room. Other variants will be apparent to persons skilled in the art and do not need to be discussed further.

The illustrated circuit 100 includes a breaker 108 connected to the wires 102, 104 of the main supply line. The circuit 100 includes a first wire 110 connected to the breaker 108. An electronic thermostat 112 is mounted in series on the circuit 100 using a pair of wires 114, 116 coming out of the thermostat 112. The first thermostat wire 114 is connected to the first wire 110 and the second thermostat wire 116 is connected to a second wire 118 of the circuit 100.

It should be noted that the illustrated electronic thermostat 112 is also generic in nature and accordingly, some features may vary from one model to another. This electronic thermostat 112 includes an internal circuitry 112a that is schematically represented in FIG. 1. A display screen 112b and some control buttons 112c are also schematically depicted.

Inside the thermostat 112 is provided an internal arrangement to obtain the power it needs without a neutral or ground wire. Such arrangement is known in the art and need not to be described herein. See for instance U.S. Pat. No. 4,776,514 issued 11 Oct. 1988 to Johnstone et al., the content of which is hereby incorporated by reference.

The second wire 118 is connected to a switching device 120. The switching device 120 is part of the energy management system. In FIG. 1, the switching device 120 is connected to an energy management console 122 through a wire 124 providing a communication channel between them. This wire 124 provides the power required for operating the switching device 120. Variants are possible as well. For instance, the communication can be done at least in part in a wireless manner. The switching device 120 can be a relay or another device that is able to instantly open or close the circuit 100 following commands from the console 122 of the energy management system. The switching device 120 has an "open position" and a "closed position". In the "open position", the circuit 100 is "open" and no electricity can flow in the circuit 100. In the "closed position", the circuit 100 is "closed" and is controlled by the thermostat 112.

It should be noted that the exact location of the switching device 120 on the circuit 100 can be different from what is shown and described herein.

The circuit 100 further includes the heating unit 106 mounted in series. The heating unit 106 is connected to the switching device 120 using a third circuit wire 126. It is also connected to the breaker 108 using a fourth circuit wire 128.

In use, when the circuit 100 is closed, the electronic thermostat 112 reads the ambient temperature in the room and controls the power supplied to the heating unit 106 to maintain desired temperature in the room. Depending on the thermostat model, power provided to the heating unit 106 can be pulsed or not.

The energy management system will be used to cut off the power to the circuit 100 in some circumstances. For instance, during a hot summer day, the heating unit can be deactivated by opening the circuit 100 using the switching device 120. This way, no heat can be generated by the heating unit 106 even if an occupant of the room sets the thermostat 112 to the highest set point. Energy will be saved since the heat would otherwise be wasted. Some energy management systems can also be designed to limit the heating capacity of the heating unit 106 based on an algorithm, a look up table or the like. For instance, if an occupant leaves a door or a window open for a long period of time during a cold weather condition, the thermostat 112 will command the heating unit 106 to generate more heat than usual so as to compensate for the wasted heat. To prevent such situation, the energy management system can be programmed to limit the power consumption to match what the heating unit 106 would normally consume in the current weather condition. Reducing the heating capacity will result in a drop of the ambient temperature since the heating unit 106 will no longer be able to compensate the unexpected heat losses. The occupant will then have no choice but to close the door or the window for the ambient temperature to rise.

In some cases, the energy management system can also be used to keep the heating capacity below the maximum capacity of the heating unit 106. This is useful when the heating unit 106 is too powerful for the zone. For instance, in a zone where the maximum heating requirement is 1200 Watts in the coldest weather condition but the heating unit has a capacity of 1500 Watts, the maximum duty cycle can be set to 80%. Thus, the heating unit 106 will never deliver its maximum of 1500 Watts.

One way of limiting the heating capacity of a heating unit 106 is to pulse the power provided thereto using the switching device 120. Pulsing can be done very rapidly, for instance within a cycle of one second or less, or over a longer period of time, for instance a few seconds. Longer cycles can be useful to reduce the processing power at the console 122 and for various other reasons. However, if the length of the cycle is relatively long and the duty cycle is relatively low, the circuit 100 can become open for many seconds. If the thermostat 112 is not able to keep its internal circuitry 112a energized for such a period of time, it run out of power.

Figure 2A:
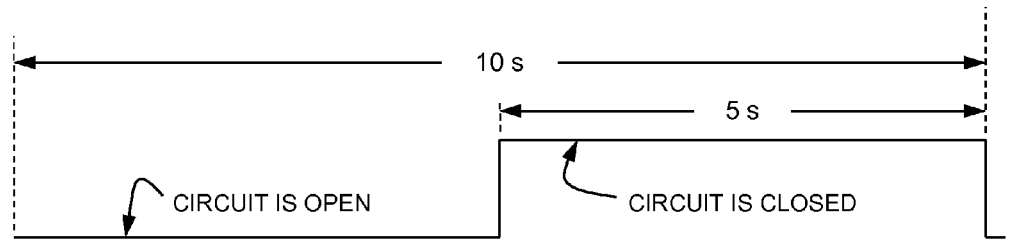
FIG. 2A is a graph depicting an example of the first signal.

FIG. 2A is a graph depicting an example of the signal sent by the console 122 to the switching device 120 via the wire 124. In this example, the first signal is a pulsed-width modulation (PWM) driver signal to operate the switching device 120. The cycle of this first signal has a length of 10 seconds and the duty cycle is 50%. The circuit 100 is closed for 5 consecutive seconds and is open for the rest of the time during the cycle. The circuit 100 is opened to prevent the load, for instance the heating unit 106, from operating. Thus, the heating unit 106 will not be able to generate more than 50% of the heat it can generate at full power. The thermostat 112 still controls the heating unit 106 during the time the circuit 100 is closed.

Figure 2B:
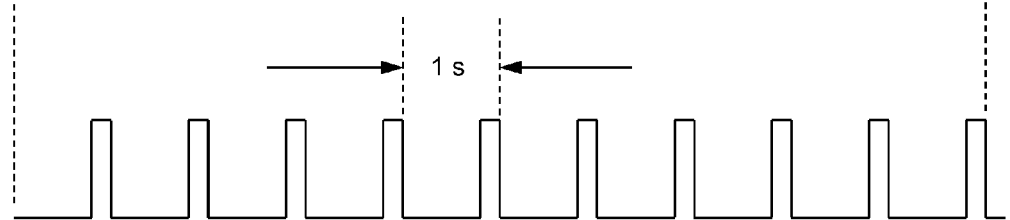
FIG. 2B is a graph depicting an example of the second signal.

FIG. 2B is a graph depicting an example of the second signal. In this example, this second signal a pulsed-width modulation (PWM) driver signal sent by the console 122 to the switching device 120 via the wire 124. The second signal is sent once every second for a short period of time. During this period, the switching device 120 will temporarily close the circuit 100 for a brief moment so as to keep the internal circuitry 112a of the thermostat 112 energized while still substantially preventing the load from operating. The duty cycle of the second signal is very low. The second signal is sent at least when the circuit 100 is opened by the switching device 120 in response to the first signal.

In FIG. 1, the first signal and the second signal are generated at subunits 122a and 122b, respectively.

Figure 2C:
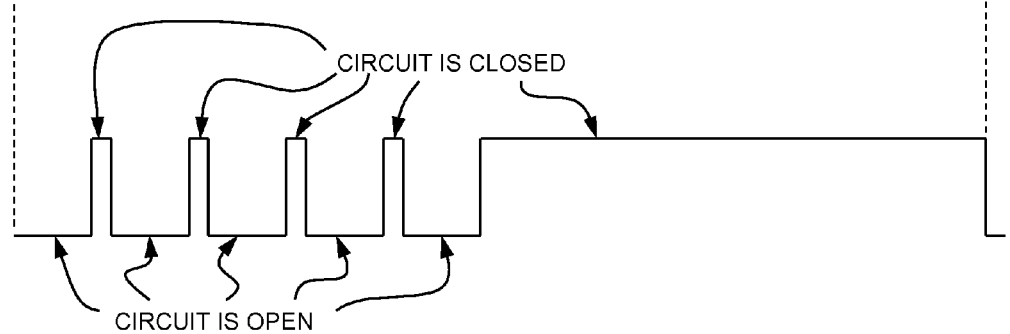
FIG. 2C is a graph depicting the resulting combined signal at the switching device that receives the first signal of FIG. 2A and the second signal of FIG. 2B.

FIG. 2C is a graph depicting the resulting combined signal at the switching device that receives the first signal of FIG. 2A and the second signal of FIG. 2B. Both signals are combined to one another.

In use, adjustment of the duty cycle of the second signal can be made to find the substantially shortest period of time required for preventing the internal circuitry 112a of the electronic thermostat 112 from running out of power.

Figure 3:
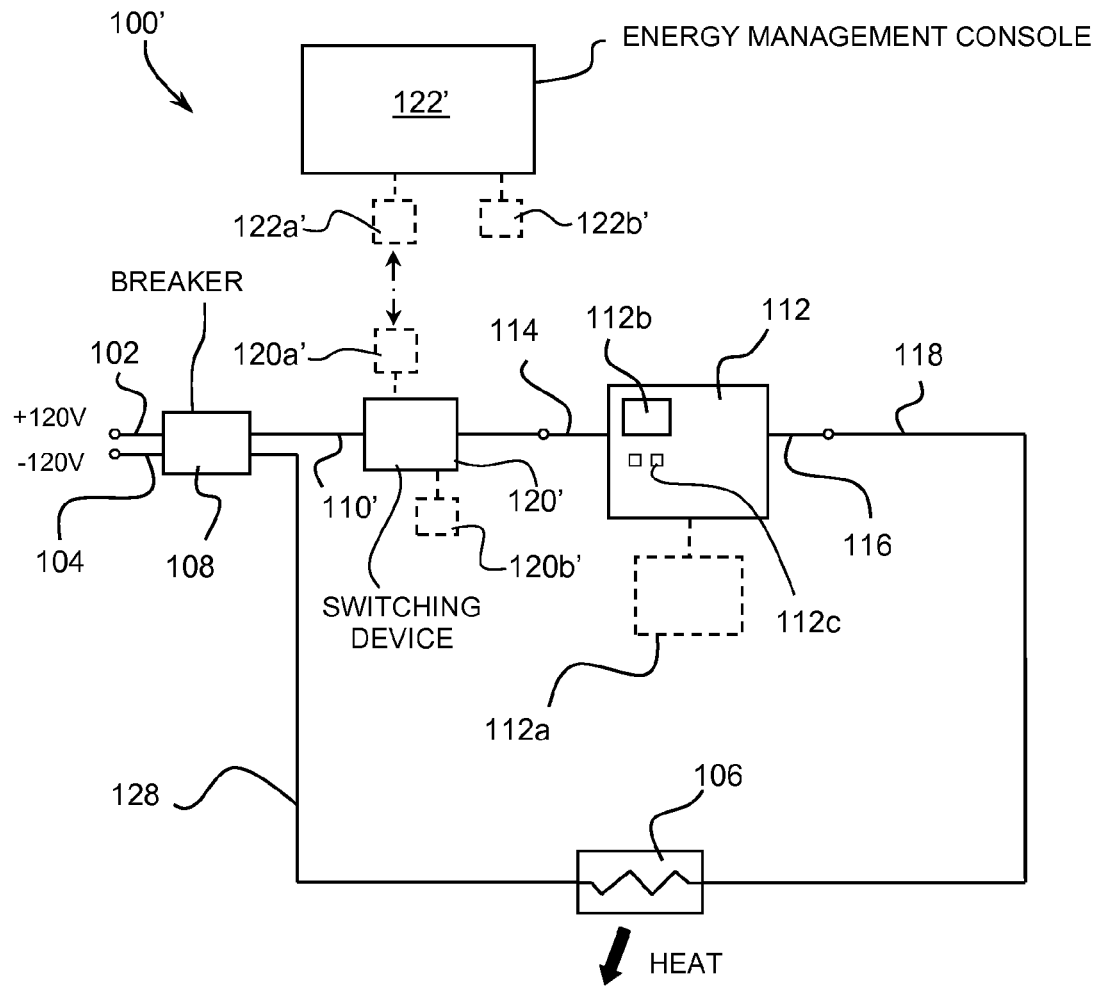
FIG. 3 is a view similar to FIG. 1 but illustrates a variant thereof.

FIG. 3 is a view similar to FIG. 1 but illustrates a variant thereof. FIG. 3 includes a simplified local electric circuit 100' where a switching device 120' is mounted in series on a wire 110', thus between the breaker 108 and the electronic thermostat 112. The switching device 120' communicates with the energy management console 122' through a wireless communication channel. The switching device 120' includes a communication subunit 120a' and the energy management system 122' also includes a communication subunit 122a'.

Also in FIG. 3, the first pulsed signal is generated at a subunit 122b' of the energy management console 122'. However, the second pulsed signal is generated at a subunit 120b' of the switching device 120' itself.

As can be appreciated, this method provides a simple but efficient way of preventing electronic thermostats from becoming powerless. The second signal can be sent constantly, even if the first signal is not sent for a long time, for example during the summer.

The present detailed description and the appended figures are meant to be exemplary only, and a skilled person will recognize that many changes can be made while still remaining within the proposed concept. For instance, the first and/or the second signal do not necessarily need to be a PWM signal. Each signal can be a command signal instead of a driver signal. The second signal does not necessarily need to be at regularly-spaced intervals. Still, many other variants of the proposed concept will be apparent to a skilled person, in light of a review of the present disclosure.

What is claimed is:

1. A method of operating a remotely-controlled switching device of an energy management system, the switching device being mounted in series on a local electrically powered circuit on which are also mounted in series a load and an electronic thermostat, the method including:
    generating a first pulsed signal for controlling the switching device, the switching device opening and closing the circuit in response to the first signal, the circuit being opened to prevent the load from operating and being closed when operation of the load is allowed; and
    generating a second pulsed signal for controlling the switching device at least when the circuit is opened by the switching device in response to the first signal, the second signal causing the switching device to temporarily close the opened circuit at given intervals for keeping an internal circuitry of the electronic thermostat energized while still substantially preventing the load from operating.

2. The method as defined in claim 1, wherein the load includes a heating unit.

3. The method as defined in claim 1, wherein the first signal is a pulsed-width modulation (PWM) driver signal.

4. The method as defined in claim 3, wherein the first PWM signal is generated by the energy management system.

5. The method as defined in claim 4, wherein the second signal is a pulsed-width modulation (PWM) driver signal.

6. The method as defined in claim 5, wherein the second PWM signal is generated by the energy management system.

7. The method as defined in claim 5, wherein the second PWM signal closes the switching device at regularly-spaced intervals.

8. The method as defined in claim 1, wherein the second signal is a pulsed-width modulation (PWM) driver signal.

9. The method as defined in claim 1, wherein the first signal and the second signal are sent to the switching device over a single communication channel.

10. The method as defined in claim 9, wherein the communication channel is a wired link interconnecting an output of the energy management system with the switching device.

11. The method as defined in claim 5, wherein the second PWM signal is generated at the switching device.

12. The method as defined in claim 11, wherein the first signal is sent the switching device through a wireless link.

13. The method as defined in claim 1, further including the step of:
    adjusting a duty cycle of the second signal at substantially the shortest period of time required for preventing the internal circuitry of the electronic thermostat from running out of power.

14. The method as defined in claim 4, further including the step of:
    adjusting a duty cycle of the second signal at substantially the shortest period of time required for preventing the internal circuitry of the electronic thermostat from running out of power.

15. The method as defined in claim 5, further including the step of:
adjusting a duty cycle of the second signal at substantially the shortest period of time required for preventing the internal circuitry of the electronic thermostat from running out of power.

16. The method as defined in claim 6, further including the step of:
adjusting a duty cycle of the second signal at substantially the shortest period of time required for preventing the internal circuitry of the electronic thermostat from running out of power.

17. The method as defined in claim 7, further including the step of:
adjusting a duty cycle of the second signal at substantially the shortest period of time required for preventing the internal circuitry of the electronic thermostat from running out of power.

18. The method as defined in claim 8, further including the step of:
adjusting a duty cycle of the second signal at substantially the shortest period of time required for preventing the internal circuitry of the electronic thermostat from running out of power.

19. The method as defined in claim 9, further including the step of:
adjusting a duty cycle of the second signal at substantially the shortest period of time required for preventing the internal circuitry of the electronic thermostat from running out of power.

20. The method as defined in claim 11, further including the step of:
adjusting a duty cycle of the second signal at substantially the shortest period of time required for preventing the internal circuitry of the electronic thermostat from running out of power.

* * * * *